United States Patent
Lee et al.

(10) Patent No.: US 11,847,785 B2
(45) Date of Patent: Dec. 19, 2023

(54) LOCATION TRACKING DEVICE AND METHOD USING FEATURE MATCHING

(71) Applicant: KOREA ELECTRONICS TECHNOLOGY INSTITUTE, Seongnam-si (KR)

(72) Inventors: Yun Ju Lee, Seoul (KR); Suk Woo Jung, Seoul (KR); Kyung Taek Lee, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 116 days.

(21) Appl. No.: 17/451,065

(22) Filed: Oct. 15, 2021

(65) Prior Publication Data

US 2022/0198681 A1  Jun. 23, 2022

(30) Foreign Application Priority Data

Dec. 22, 2020  (KR) .......... 10-2020-0180370

(51) Int. Cl.
*G06T 7/246* (2017.01)
*G01C 21/16* (2006.01)

(52) U.S. Cl.
CPC .......... *G06T 7/248* (2017.01); *G01C 21/1656* (2020.08)

(58) Field of Classification Search
CPC .......................... G06T 7/248; G01C 21/1656
See application file for complete search history.

(56) References Cited

U.S. PATENT DOCUMENTS

| | | | |
|---|---|---|---|
| 11,410,322 B2 * | 8/2022 | Cristobal | ............... G06T 7/579 |
| 2019/0234746 A1 * | 8/2019 | Zhang | .................. G01C 21/188 |
| 2021/0103299 A1 * | 4/2021 | Zhou | .................... G08G 5/0021 |

FOREIGN PATENT DOCUMENTS

| | | | |
|---|---|---|---|
| CN | 114754768 A | * | 7/2022 |
| KR | 10-2016-0022705 A | | 3/2016 |

OTHER PUBLICATIONS

Jung et al., "Pose Tracking in Dynamic Scene using Monocular Camera and IMU sensor", KSII the 12th International Conference on Internet (ICON) 2020.

* cited by examiner

*Primary Examiner* — Pinalben Patel
(74) *Attorney, Agent, or Firm* — Knobbe, Martens, Olson & Bear, LLP

(57) ABSTRACT

This application relates to a location tracking device and method using a feature matching. The location tracking device may include a sensor, a camera, and a controller. The sensor is provided in a predetermined object and collects sensing information including at least one of speed, direction, gravity, and acceleration of the object. The camera is provided in the predetermined object and collects image information by capturing an image. The controller calculates an initial fundamental matrix ($F_0$) by using the collected sensing information and calibration information of the camera, detects feature points of the image information, performs a feature matching in a fundamental matrix (F) by combining the initial fundamental matrix and the feature points, and tracks a location of the object by using a result of the feature matching.

6 Claims, 5 Drawing Sheets

| Algorithm | Proposed | IMU | ORB | IMU+ORB KF |
|---|---|---|---|---|
| Average position (m) | 0.9996 | 1.0446 | 1.0085 | 1.0132 |
| Standard Deviation | 0.0004 | 0.0089 | 0.0251 | 0.0117 |

LOCATION TRACKING DEVICE AND METHOD USING FEATURE MATCHING

CROSS-REFERENCE TO RELATED APPLICATION

The present application claims priority to Korean Patent Application No. 10-2020-0180370 filed on Dec. 22, 2020 in the Korean Intellectual Property Office, which is incorporated herein in its entirety by reference.

BACKGROUND

Technical Field

The present disclosure relates to a location tracking technology. In particular, the present disclosure relates to a location tracking device and method using a feature matching and tracking the location of a predetermined object in real time by using a sensor and a camera.

Description of Related Technology

A location tracking technology has used a feature matching technique with an inertial measurement unit (IMU) sensor which is a device that combines a 3-axis acceleration sensor and a 3-axis gyro sensor and outputs respective sensing values. In this conventional object location tracking method using only the IMU sensor, there occurs an error due to a change in a sensing value, and as a measurement time increases, a drift error increases. Due to this, even when the object is stationary, a location value gradually increases as time passes.

SUMMARY

The present disclosure provides a location tracking device and method that accurately track a location of an object by supplementing a feature matching with a combination of sensing information and image information, and visualize a result of tracking.

According to embodiments of the present disclosure, a location tracking device using a feature matching may include a sensor, a camera, and a controller. The sensor is provided in a predetermined object and collects sensing information including at least one of speed, direction, gravity, and acceleration of the object. The camera is provided in the predetermined object and collects image information by capturing an image. The controller calculates an initial fundamental matrix ($F_0$) by using the collected sensing information and calibration information of the camera, detects feature points of the image information, performs a feature matching in a fundamental matrix (F) by combining the initial fundamental matrix and the feature points, and tracks a location of the object by using a result of the feature matching.

In addition, the sensor may be an inertial measurement unit (IMU).

In addition, the controller may remove an outlier from the feature matching result by using an epipolar geometry.

In addition, the controller may discriminate the outlier by a distance between points when the object is stationary, and discriminate the outlier through a distance between a point and a line by using an epipolar line when the object moves.

In addition, the controller may determine a point more than a predetermined distance away from the epipolar line as the outlier.

In addition, when the feature matching is a feature matching in the initial fundamental matrix, the controller may change the initial fundamental matrix to the fundamental matrix and then perform the feature matching again.

According to embodiments of the present disclosure, a location tracking method implemented by a location tracking device using a feature matching may include collecting sensing information and image information, the sensing information including at least one of speed, direction, gravity, and acceleration of a predetermined object, and the image information obtained by capturing an image, calculating an initial fundamental matrix by using the collected sensing information and camera calibration information, detecting feature points in the collected image information, performing a feature matching in a fundamental matrix by combining the initial fundamental matrix and the feature points, and tracking a location of the object by using a result of the feature matching.

In addition, the method may further include, after performing the feature matching, removing an outlier from the feature matching result by using an epipolar geometry.

According to the present disclosure, the location tracking device and method can calculate an initial object pose from sensing information and perform a feature matching by using an epipolar geometry based on the calculated information and image information.

Through this, the device and method according to the present disclosure can improve the precision of location tracking compared to conventional techniques, and is capable of visualizing the result of the improved precision.

DETAILED DESCRIPTION

In addition, a current method using a feature matching tends to show inaccurate data due to image instability. This causes a problem that the location value fluctuates greatly even when the object is stationary. In order to compensate for these problems, the tendency of the location value can be stabilized through the Kalman filter algorithm. However, the inability to increase the precision of the absolute value is still a problem to be solved.

Hereinafter, an embodiment of the present disclosure will be described in detail with reference to the accompanying drawings. The present disclosure may, however, be embodied in many different forms and should not be construed as being limited to the embodiment set forth herein. Rather, this embodiment is provided so that the disclosure will be thorough and complete and will fully convey the scope of the disclosure to those skilled in the art. Accordingly, an embodiment described herein should be understood to include various modifications, equivalents, and/or alternatives.

In addition, techniques that are well known in the art and not directly related to the present disclosure are not described herein. This is to clearly convey the subject matter of the present disclosure by omitting an unnecessary explanation. Also, the terms are merely used for describing a particular embodiment but do not limit the embodiment. Singular forms are intended to include plural forms unless the context clearly indicates otherwise.

Figure 1:
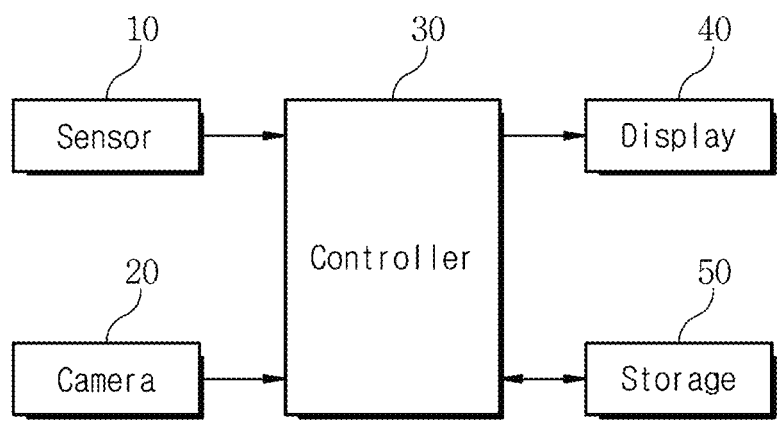
FIG. 1 is a block diagram illustrating a location tracking device according to an embodiment of the present disclosure.
Figure 2A:
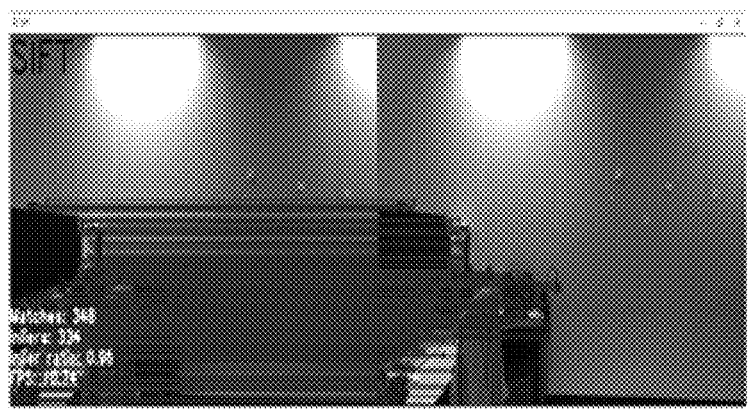
FIGS. 2A, 2B, 2C and 2D are views illustrating feature matching of image information according to an embodiment of the present disclosure.
Figure 2B:
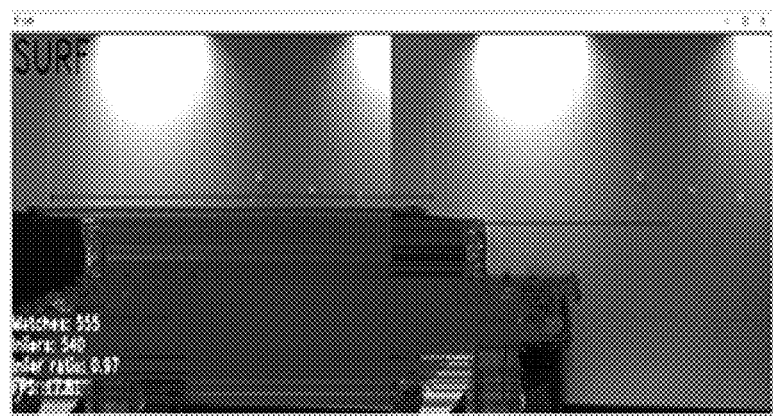
Figure 2C:
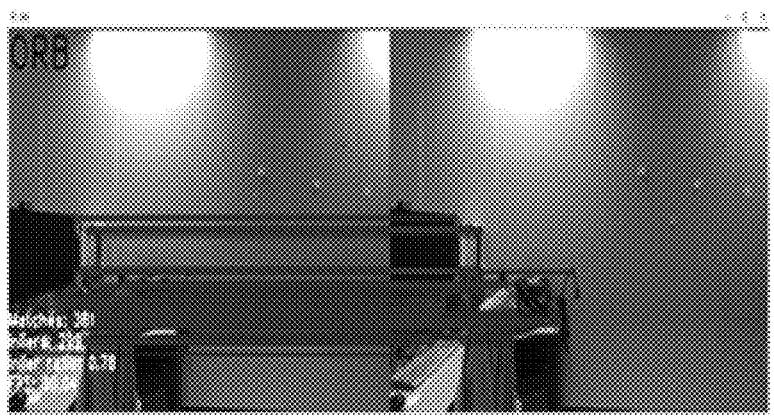
Figure 2D:
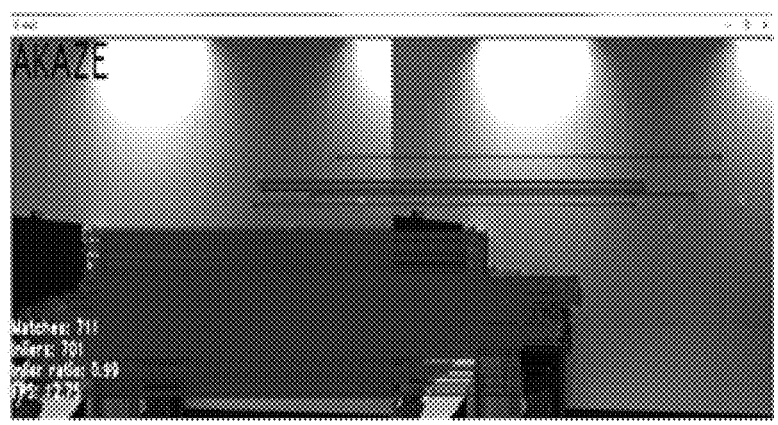
Figure 3A:
FIG. 3A and FIG. 3B are views illustrating outlier removal according to an embodiment of the present disclosure.
Figure 3B:

FIG. 1 is a block diagram illustrating a location tracking device according to an embodiment of the present disclosure. FIGS. 2A, 2B, 2C and 2D are views illustrating feature matching of image information according to an embodiment of the present disclosure. FIGS. 3A and 3B are views illustrating outlier removal according to an embodiment of the present disclosure. Specifically, FIGS. 2A-2D show feature point detection processes using algorithms of SIFT, SURF, ORB, and AKAZE, respectively. In addition, FIG. 3A shows a process of discriminating an outlier by using an epipolar line, and FIG. 3B shows a result of removing the discriminated outlier.

Referring to FIGS. 1 to 3B, the location tracking device 100 tracks the location of a predetermined object. Here, the predetermined object may be, but is not limited to, a thing or a person. The location tracking device 100 accurately tracks the object location by supplementing a feature matching through a combination of sensing information and image information, and visualize the tracked result. The location tracking device 100 includes a sensor 10, a camera 20, and a controller 30, and may further include a display 40 and a storage 50.

The sensor 10 is provided in the predetermined object, and collects sensing information including at least one of speed, direction, gravity, and acceleration of the object. The sensor 10 may collect such information based on an acceleration coordinate system consisting of three axes of X, Y, and Z and an inertial coordinate system consisting of three axes of roll, pitch, and yaw. The sensor 10 may be an inertial measurement unit (IMU).

The camera 20 is provided in the predetermined object, and collects image information by capturing an image. In particular, the camera 20 may capture an image viewed by the object. Depending on the implementing environment of the location tracking device 100, the camera 20 may be configured as a single module with the sensor 10.

The controller 30 performs the overall control of the location tracking device 100. Specifically, the controller 30 tracks the pose of the object by using the sensing information received from the sensor 10, and calculates an initial fundamental matrix ($F_O$) by using the tracked pose and camera calibration information received from the camera 20.

The controller 30 detects feature points contained in the image by using the image information collected by the camera 20. The controller 30 may detect the feature points by using various types of detection algorithms. For example, the controller 30 may use feature point detection algorithms such as SIFT, SURF, ORB, and AKAZE. In addition, the controller 30 may calculate an essential matrix by using eight or more feature points in the image of the image information. Using the calculated essential matrix, the controller 30 may calculate the camera calibration information of the camera 20 and the position and direction of the sensor 10.

The controller 30 performs a feature matching in a fundamental matrix (F) by combining the calculated initial fundamental matrix and the detected feature points. A result of the feature matching may contain an outlier due to various reasons such as light change, blurring, and object movement. Accordingly, the controller 30 needs to remove such an outlier from the feature matching result. For example, the controller 30 may remove the outlier by using an epipolar geometry. Specifically, when the object is stationary, the controller 30 discriminates the outlier by a distance between points and removes the outlier. When the object moves, the controller 30 discriminates the outlier through a distance between a point and a line by using an epipolar line and removes the outlier. In this case, the controller 30 may determine a point more than a predetermined distance away from the epipolar line as the outlier. Preferably, the controller 30 may correct an error by further reflecting the sensing information collected by the sensor 10 in the feature matching result.

The controller 30 tracks the location of the object by using the feature matching result. In particular, when the feature matching is not a feature matching in the fundamental matrix but a feature matching in the initial fundamental matrix, the controller 30 may change the initial fundamental matrix to the fundamental matrix and then perform the feature matching again so as to track the location of the object. As such, by tracking the object through the fundamental matrix in which the image information is also reflected, not the initial fundamental matrix calculated initially from the sensing information only, the controller 30 can track the object more accurately.

The display 40 outputs the sensing information collected by the sensor 10 and the image information collected by the camera 20. The display 40 visually offers the object location tracked by the controller 30 using the detected feature points and the feature matching result.

The storage 50 stores an algorithm and/or a program to be executed by the location tracking device 100. In addition, the storage 50 stores the sensing information collected by the sensor 10 and the image information collected by the camera 20. Also, the storage 50 stores the object location tracked by the controller 30 using the detected feature points and the feature matching result. The storage 50 may include at least one storage medium from among a flash memory, a hard disk, a media card micro type memory, a card type memory (e.g., SD or XD memory), a random access memory (RAM), a static RAM (SRAM), a read-only memory (ROM), a programmable ROM (PROM), an electrically erasable PROM (EEPROM), a magnetic memory, a magnetic disk, and an optical disk.

Figure 4A:
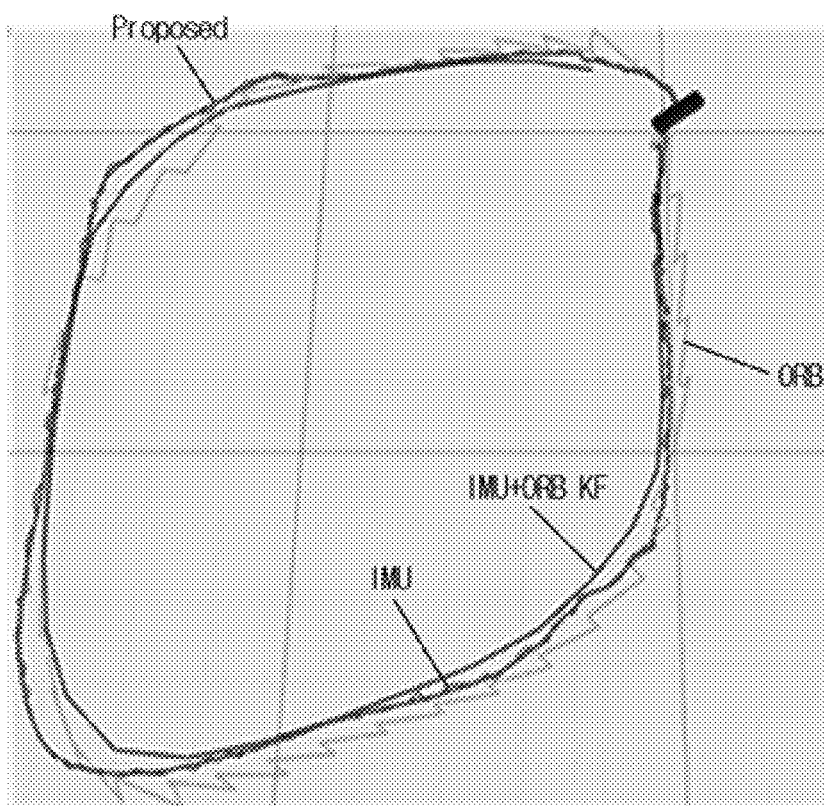
FIGS. 4A, 4B and 4C are views illustrating a performance evaluation comparison result among conventional techniques and a location tracking device according to an embodiment of the present disclosure.
Figures 4B, 4C:

FIGS. 4A, 4B and 4C are views illustrating a performance evaluation comparison result among conventional techniques and a location tracking device according to an embodiment of the present disclosure. FIG. 4A shows the performance evaluation results in case of combining sensing information and image information through a conventional Kalman filter, in case of using sensing information only, in case of using image information only, and in case of the location tracking device of the present disclosure. In addition, FIG. 4B shows an actual implementation of the location tracking device, and FIG. 4C shows the comparison results of performance evaluation.

Referring to FIGS. 1 and 4C, the location tracking device 100 can improve the precision of location tracking compared to conventional techniques, and is capable of visualizing the result of the improved precision.

For conventional techniques and the location tracking device 100 according to the present disclosure, the performance were evaluated. As the sensor and camera of the location tracking device 100, an artificial intelligence stereo camera, ZED2, was used.

From FIGS. 4A and 4C, it can be seen that the location tracking device 100 has an excellent average error compared to conventional techniques. That is, it can be seen that the location tracking device 100 is superior in location tracking precision to conventional techniques.

Figure 5:
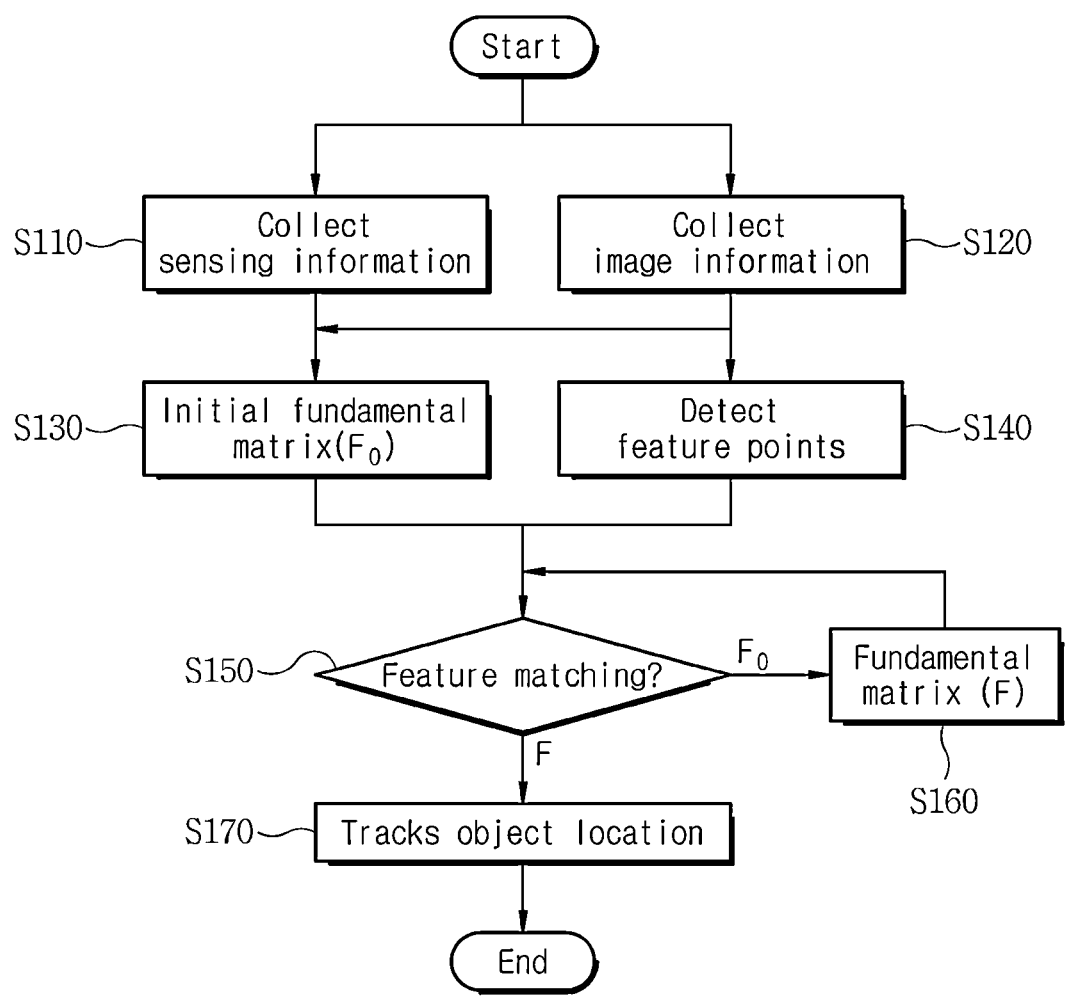
FIG. 5 is a flow diagram illustrating a location tracking method according to an embodiment of the present disclosure.

FIG. 5 is a flow diagram illustrating a location tracking method according to an embodiment of the present disclosure.

Referring to FIGS. 1 and 5, the location tracking method may calculate an initial pose of an object from sensing information and perform a feature matching using an epipolar geometry based on the calculated information and image information. Through this, the location tracking method can improve the location tracking precision.

At step S110, the location tracking device 100 collects sensing information. Specifically, the location tracking device 100 collects the sensing information including at least one of speed, direction, gravity, and acceleration of a predetermined object. For example, the location tracking device 100 may collect such information based on an acceleration coordinate system consisting of three axes of X, Y, and Z and an inertial coordinate system consisting of three axes of roll, pitch, and yaw.

At step S120, the location tracking device 100 collects image information. In particular, the location tracking device 100 may collect the image information by capturing an image viewed by the object.

At step S130, the location tracking device 100 calculates an initial fundamental matrix. Specifically, the location tracking device 100 tracks the pose of the object by using the collected sensing information, and calculates the initial fundamental matrix by using the tracked pose and camera calibration information.

At step S140, the location tracking device 100 detects feature points. Specifically, the location tracking device 100 detects the feature points contained in the image by using the collected image information. In addition, the location tracking device 100 may detect the feature points by using various types of detection algorithms. For example, the location tracking device 100 may use feature point detection algorithms such as SIFT, SURF, ORB, and AKAZE.

At step S150, the location tracking device 100 determines whether a feature matching in the initial fundamental matrix or a feature matching in a fundamental matrix. In case of the feature matching in the initial fundamental matrix calculated at the step S130, the location tracking device 100 performs step S160. In case of the feature matching in the fundamental matrix in which the initial fundamental matrix and the feature points are combined, the location tracking device 100 performs step S170.

At step S160, the location tracking device 100 changes the initial fundamental matrix to the fundamental matrix, and then performs the step S150 again. That is, the location tracking device 100 is capable of tracking the object by using the fundamental matrix in which the image information is also reflected, not the initial fundamental matrix calculated from the sensing information only.

At step S170, the location tracking device 100 tracks the object location. Based on both the sensing information and the image information, the location tracking device 100 can accurately track the location of the object.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. A location tracking device using a feature matching, the device comprising:
   a sensor provided in an object and configured to collect sensing information including at least one of speed, direction, gravity, or acceleration of the object;
   a camera provided in the object and configured to collect image information by capturing an image; and
   a controller configured to:
      calculate an initial fundamental matrix ($F_0$) by using the collected sensing information and calibration information of the camera,
      detect feature points of the image information,
      determine whether feature matching is to be performed in the initial fundamental matrix ($F_0$) or in a fundamental matrix (F),
      when the feature matching is to be performed in the fundamental matrix (F), perform the feature matching in the fundamental matrix (F) by combining the initial fundamental matrix ($F_0$) and the feature points, and
      track a location of the object by using a result of the feature matching,
   wherein, when the feature matching is to be performed in the initial fundamental matrix ($F_0$), the controller is configured to:
      set the fundamental matrix (F) with the initial fundamental matrix ($F_0$), and
      perform the feature matching in the fundamental matrix (F) again.

2. The device of claim 1, wherein the sensor comprises an inertial measurement unit (IMU).

3. A location tracking device using a feature matching, the device comprising:
   a sensor provided in an object and configured to collect sensing information including at least one of speed, direction, gravity, or acceleration of the object;
   a camera provided in the object and configured to collect image information by capturing an image; and
   a controller configured to calculate an initial fundamental matrix ($F_0$) by using the collected sensing information and calibration information of the camera, detect feature points of the image information, perform a feature matching in a fundamental matrix (F) by combining the initial fundamental matrix ($F_0$) and the feature points, and track a location of the object by using a result of the feature matching,
   wherein the controller is configured to remove an outlier from the feature matching result by using an epipolar geometry.

4. The device of claim 3, wherein the controller is configured to discriminate the outlier by a distance between points when the object is stationary, and discriminate the outlier through a distance between a point and a line by using an epipolar line when the object moves.

5. The device of claim 4, wherein the controller is configured to determine a point more than a predetermined distance away from the epipolar line as the outlier.

6. A location tracking method implemented by a location tracking device using a feature matching, the method comprising:

collecting sensing information and image information, the sensing information including at least one of speed, direction, gravity, or acceleration of an object, and the image information obtained by capturing an image;

calculating an initial fundamental matrix by using the collected sensing information and camera calibration information;

detecting feature points in the collected image information;

performing feature matching in a fundamental matrix by combining the initial fundamental matrix and the feature points;

removing an outlier from the feature matching result by using an epipolar geometry; and tracking a location of the object by using a result of the feature matching.

* * * * *